United States Patent
Lilja et al.

(10) Patent No.: US 6,904,279 B1
(45) Date of Patent: Jun. 7, 2005

(54) METHOD TO DETERMINE CHANNEL INFORMATION IN A CELLULAR SYSTEM, AND A MOBILE STATION

(75) Inventors: Harri Lilja, Oulu (FI); Jari Vallström, Oulu (FI)

(73) Assignee: Nokia Mobile Phones, Ltd., Espoo (FI)

( * ) Notice: Subject to any disclaimer, the term of this patent is extended or adjusted under 35 U.S.C. 154(b) by 0 days.

(21) Appl. No.: 09/458,906

(22) Filed: Dec. 10, 1999

(30) Foreign Application Priority Data

Dec. 14, 1998 (FI) .................................................. 982700

(51) Int. Cl.[7] .................................................. H04Q 7/20
(52) U.S. Cl. .............................. 455/426.2; 455/67.11; 370/337; 370/347
(58) Field of Search .......................... 370/337, 336, 370/332, 314, 321, 326, 347, 345; 455/426.2, 436, 437, 442, 443, 67.11

(56) References Cited

U.S. PATENT DOCUMENTS

| | | | | |
|---|---|---|---|---|
| 5,493,563 A | * | 2/1996 | Rozanski et al. | ............ 370/332 |
| 6,044,272 A | * | 3/2000 | Kobylinski et al. | ......... 455/437 |
| 6,192,244 B1 | * | 2/2001 | Abbadessa | .................. 455/436 |
| 6,327,469 B1 | * | 12/2001 | Gaastra | ....................... 455/436 |

FOREIGN PATENT DOCUMENTS

| WO | WO 96/19086 | 6/1996 |
|---|---|---|
| WO | WO 96/21998 | 7/1996 |

\* cited by examiner

*Primary Examiner*—Nick Corsaro
*Assistant Examiner*—Philip J. Sobutka
(74) *Attorney, Agent, or Firm*—Perman & Green, LLP

(57) ABSTRACT

The object of the invention is a method for determining channel information in a cellular system, where user information is transmitted in information frames transmitted by the base station of the current cell, and in which method neighbor cell base station information is received (25, 26, 32, 43, 44, 53, 55, 57) for the synchronizing to the neighbor cell base station. In a method according to the invention the Base Station Identity Code (BSIC) information is received and examined (53, 55, 57) only outside the TDMA frames used to transmit the information. Said code information is stored in the memory of the mobile station for the period of the TDMA frames used to transmit information. The method is also advantageously used in a Wireless Local Loop terminal utilizing HSCSD protocol for determining and storing channel information. When the method according to the invention is used a WLL terminal needs no extra frequency synthesizer for performing the neighbor cell monitoring.

4 Claims, 4 Drawing Sheets

Fig. 3

| MS RX | RX | RX | RX | 3 | 4 | 5 | 6 | 7 | RX |
|---|---|---|---|---|---|---|---|---|---|
| MS TX | 5 | 6 | 7 | 0 | TX | TX | 3 | 4 | 5 |
| Monitoring | | | | | | | 31 | 32 | 33 |

| MS RX | 0 | 1 | 2 | RX | RX | RX | RX | RX | 0 | 1 | 2 | 3 | 4 | 5 | 6 | 7 | 0 | 1 | 2 | 3 | RX |
|---|---|---|---|---|---|---|---|---|---|---|---|---|---|---|---|---|---|---|---|---|---|
| MS TX | 5 | 6 | 7 | 0 | 1 | 2 | 3 | 4 | 5 | TX | 7 | 0 | 1 | 2 | 3 | 4 | 5 | 6 | 7 | 0 | 1 |
| Non-serving cell down-link | F | 1 | 2 | 3 | 4 | 5 | 6 | 7 | S | 1 | 2 | 3 | 4 | 5 | 6 | 7 | C | 1 | 2 | | |

| MS RX | RX | RX | RX | RX | RX | 5 | 6 | 7 | 0 | 1 | 2 | 3 | 4 | 5 | 6 | 7 | RX | RX | RX | RX | RX |
|---|---|---|---|---|---|---|---|---|---|---|---|---|---|---|---|---|---|---|---|---|---|
| MS TX | 5 | 6 | 7 | 0 | 1 | 2 | TX | 4 | 5 | 6 | 7 | 0 | 1 | 2 | 3 | 4 | 5 | 6 | 7 | 0 | 1 |

Monitoring: 52, 53, 54, 55, 56, 57, 58

METHOD TO DETERMINE CHANNEL INFORMATION IN A CELLULAR SYSTEM, AND A MOBILE STATION

BACKGROUND OF THE INVENTION

The object of the invention is a method for determining channel information in a cellular system, where a TDMA (Time Division Multiple Access) transmission protocol is used on the traffic channel allocated to the user traffic connection during the user traffic connection between a mobile station and a base station of the current cell, and a mobile station realising the method. The invention is advantageously applied in a system which utilises a number of time slots of the TDMA frame to transmit information, such as in a system utilising the so called HSCSD protocol (High Speed Circuit Switched Data). Most advantageously the invention can be used in WLL (Wireless Local Loop) terminals.

Information about a base station in a neighbour cell is transmitted from the base station to the mobile station, i.a. for synchronising to the neighbour cell base station and for performing level measurements. In order to understand the invention a prior art neighbour cell monitoring in a cellular network is described in more detail below using a digital GSM system (Global System for Mobile communications) as an example.

In the GSM system separate frequency bands are allocated to transmission and reception, and on each frequency the data is transmitted as bursts in the slots of a TDMA frame. The TDMA frames contains eight time slots, of which one or more are allocated to the connection between the mobile station and the base station.

A mobile station operating in a cellular network needs information about the base stations of the active cell and of the base stations in the other cells around the mobile station so that it is able to perform a flexible handover when required. FIG. 1 shows a cell (Serving cell), which serves a mobile station of the system, and the six other cells (Cell 1 to Cell 6) which are located around it. The mobile station measures the signal levels (RXLEV) which it receives from the base stations of these cells, and reports the measurement data to the serving base station. In the GSM system each base station has a certain transmission frequency, a so called broadcasting frequency, at which the base station continuously transmits with a constant power. The mobile station measures the power received from the base stations at the broadcasting frequency of respective base station. In the following said signal level measurement (RXLEV) of the neighbour base stations is called "neighbour cell base station level measurement".

The mobile station must also receive the Base Station Identity Code (BSIC) of each base station so that the mobile station knows which base station's signal level it measures at each frequency. Each base station transmits regularly the identity code. One time slot of the TDMA frames transmitted at the broadcasting frequency, the time slot "0", is allocated to channels which simultaneously transmit information to a plurality of mobile stations, i.a. for synchronising to the base station. Such channels in the GSM system are i.a. the following: the Frequency Correction CHannel (FCCH), the Synchronisation CHannel (SCH), the Broadcast Control CHannel (BCCH), and the Common Control CHannel (CCCH). Fifty-one TDMA frames form a so called 51-multiframe (Multi Frame). Regarding the above mentioned channels it is specified in which TDMA frame of the multiframe they are located. A mobile station looks for and decodes the channels located in said TDMA frame of the broadcasting frequency among the neighbour base station transmissions. Said base station identity code BSIC is transmitted on the synchronisation channel SCH.

The above mentioned function of a mobile station for receiving information transmitted by a neighbour base station is in the following called "reception of neighbour base station information". The level measurement (RXLEV) of a neighbour cell base station and reception of neighbour cell base station information (BSIC) is for short called "neighbour cell monitoring".

FIG. 2 shows the TDMA frame structure of the downlink in the GSM system and the moments when the neighbour cell monitoring is performed. The transmission and reception is presented in the figure as mobile station functions, whereby TX means data transmission on the uplink and RX means data transmission on the downlink. The TDMA frames 21, 23 and 24 contain eight time slots, of which the time slot "0" is used for data reception RX, and the data transmission TX to the base station occurs during the time slot "3". The time slot "0" in the uplink TDMA frame is located at the time slot "3" in the downlink TDMA frame, because there is a timing difference of three time slots between the downlink and uplink TDMA frames. Thus there are two unused time slots between the reception RX and transmission TX, and during these two time slots the frequency synthesiser switches from the reception frequency to the transmission frequency. Then four unused time slots are left at the end of normal TDMA frames, during which the neighbour base station level measurements are made, period 26.

A mobile station receives neighbour base station information during empty frames (so called Idle frames), every 26th TDMA frame of the frames transmitted by a base station is such an empty frame. No speech/data is transmitted in neither direction in the cell in question during an idle frame. The idle frames and the above mentioned 51-multiframes are arranged in sequences with different lengths, 26 and 51 TDMA frames, so that the SCH channel burst can be received in at least every eleventh idle frame, as is shown in the example of FIG. 2 during the shown idle frame 22, period 25. Either before or after an idle frame the transmitted frames also contain time slots which are not used by the user traffic connection, which unused time slots together with the idle frame in this case form a period of 12 time slots, during which period the neighbour base station information can be received. The neighbour base station information can also be received during the time slots of such normal TDMA frames in which the mobile station itself does not receive or transmit information of the user traffic connection.

In known solutions the time required for neighbour cell monitoring may become a problem. Each surrounding base station broadcasts on a different frequency, and therefore the frequency synthesiser of the mobile station must be able to switch sufficiently rapidly to the examined frequency so that the monitoring can be performed. When the monitoring has been performed the frequency synthesiser must rapidly return to a frequency where it can either receive or transmit information on the user traffic connection.

Problems may occur in the new broadband GSM2+, HSCSD (High Speed Circuit Switched Data) and GPRS (General Packet Radio Service) services, because in them the connection's traffic channel utilises more time slots of the TDMA frame than in the previous basic systems. FIG. 3 presents as an example a frame structure which is used in a mobile station according to the HSCSD class 12 MS. In said class it is possible to use a total of five time slots out of the eight in a frame, so that the majority of the time slots are allocated to reception. In the example of FIG. 3, of the eight time slots belonging to the frame three time slots are used for reception RX and two time slots for transmission TX. In FIG. 3 the TDMA frame RX of the downlink and the TDMA frame TX of the uplink are presented as separate frames.

The HSCSD classes include full duplex systems in which a mobile station can simultaneously both transmit and receive information. However, in the case of FIG. 3, HSCSD class 12 MS, the mobile station is in a half duplex operating state. Of all half duplex HSCSD classes this class presents the highest requirements on the frequency synthesiser. In the case of FIG. 3 the neighbour base station level measurement 32 made within the TDMA frame at the interface between the transmit time slots 3 and 4 requires a frequency hop to the examined frequency 31 before the measurement. After the measurement 32 a new hop is made to the reception frequency 33 of the traffic channel.

In addition to the neighbour base station level measurement made within the TDMA frame used by the traffic channels there are also made level measurements during the idle frame and the idle time slots adjacent to it. The corresponding period is it the following called the "Idle period". In the example case of FIG. 4 the length of said period 41 is 10 time slots. FIG. 4 shows the TDMA frames transmitted on the broadcasting frequency of a neighbour base station, and the time slots 42, 43 and 44 allocated to the FCCH, SCH and CCCH channels in these TDMA frames. As is observed in FIG. 4 the time slot S of the synchronisation channel is in this case located at the very beginning of the available reception period, whereby the frequency synthesiser has not yet had time to settle on the broadcasting frequency of the neighbour base station. When the settling time with a length of about one slot of the frequency synthesiser is taken into account, then there are actually only eight time slots during which the synchronisation channel can be received. In some HSCSD classes the time slots allocated to the traffic channel can not be used to receive neighbour base station information, because several extra time slots are allocated to the mobile station. In this case the timing of the received neighbour base station channels can become critical regarding the available time. The time slot of the received channel occurs either at the very beginning of the Idle period or at its end, whereby the frequency synthesiser has not enough time to perform the required frequency hops.

The FIG. 4 shows how a mobile station receives neighbour cell transmissions during the Idle period. In this example the synchronisation channel 43 and the control channel 44 occurs within this Idle period window there. The shown situation is most unfavourable, because only the reception of the control channel 44 is successful as there is sufficiently time on both sides of it for the frequency synthesiser to make the frequency hop. Thus the search for all channels of the neighbour cell base stations and the decoding of the information contained in them requires a lot of time in the mobile station. In the cases shown in FIGS. 3 and 4 a successful monitoring in a mobile station using the HSCSD protocol requires either the use of a very fast frequency synthesiser or one extra synthesiser only for the neighbour cell monitoring. Corresponding situations requiring a rapid frequency hop occur also in other HSCSD classes.

In the above described situations the mobile station does not have time to perform a perfect neighbour cell monitoring. In order to solve this problem the mobile station must be equipped with either a faster frequency synthesiser or with a second frequency synthesiser intended for monitoring purposes. However, the manufacturing of a very fast frequency synthesiser requires special components, and therefore the use of such a frequency synthesiser in conventional mobile stations would cause substantial extra costs. The addition of a second frequency synthesiser would also cause substantial extra costs. Secondly, the use of a fast frequency synthesiser or of two frequency synthesisers would increase the power required by the mobile station, which shortens the operational time of a mobile station equipped with a battery.

SUMMARY OF THE INVENTION

The object of the invention is to present a solution which can avoid the above described disadvantages related to the prior art. With the aid of the invention the required neighbour cell monitoring can be performed in a mobile station using a multi-slot protocol, so that the mobile station can be realised using a conventional frequency synthesiser.

The invention is based on the perception that in a normal operating situation the information about a stationary mobile station, about the cell serving it, and about the neighbour base stations, scarcely change from one moment to the next. In the following such a still standing mobile station is called a stationary mobile station. Such mobile stations are i.a. a WLL terminal and a so called radio terminal, which is used i.a. in remote control and automation applications. Changes in the connection's identity codes can be caused for instance by the introduction of a new base station, or when a large obstacle in the communication path appears or disappears during a user traffic connection. Thus the received neighbour cell base station identity codes (BSIC) will remain unchanged with a high probability during a user traffic connection. According to the present invention this information is stored in the mobile station, advantageously a stationary mobile station, before the user traffic connection is established and for the whole user traffic connection period, and a new complete neighbour cell monitoring step is performed only when this user traffic connection has been terminated. The level measurements (RXLEV) of the base stations in the neighbouring cells can be made during empty frames, or alternatively also they can be made only outside the user traffic connection.

An advantage of the invention is that a conventional frequency synthesiser can be used when only the neighbour base station signal levels (RXLEV) are monitored during a user traffic connection in an environment using a multi-timeslot protocol. This is advantageous both regarding the power consumption of the mobile station and its manufacturing costs.

An advantage of the invention is also that the structure of the mobile station will become simpler and its operation will be reliable, because the circuits don't have to operate at the extreme limits of the specifications regarding the operating speed and because there is no need for multiple frequency synthesiser circuits.

A further advantage of the invention is that also a movable mobile station can, when it is stationary, increase the efficiency of the data communication with the base station, in other words it can switch over to use more time slots and thus enable an effective use of for instance multimedia services, either in the mobile station itself or with the aid of other devices connected to it.

A method according to the invention is characterised in that the reception of the neighbour cell base station identity code (BSIC) is prevented during a user traffic connection. A method according to the invention is also characterised in that the level measurement (RXLEV) of the neighbour cell base stations is prevented during a TDMA frame allocated to the traffic channels.

A mobile station according to the invention is characterised in that it comprises means to prevent the reception of neighbour cell base station data (BSIC) during a user traffic connection. A mobile station according to the invention is also characterised in that it comprises means to prevent the neighbour cell base station level measurement (RXLEV) during a TDMA frame allocated to the traffic channels.

Preferred embodiments of the invention are presented in the dependent claims.

BRIEF DESCRIPTION OF THE DRAWING

The invention is described in detail below. In the description reference is made to the enclosed drawings, in which FIG. 3 shows an example of the monitoring in a normal frame structure of the HSCSD class 12 MS.

FIG. 4 shows an example of the monitoring during the Idle period of the HSCSD class 12 MS.

FIG. 5 shows the monitoring according to the invention in an environment according to the HSCSD protocol.

The FIGS. 1 to 4 were described above in connection with the description of prior art.

DETAILED DESCRIPTION OF THE INVENTION

FIG. 5 shows a usage according to the invention for monitoring neighbour cells in a stationary mobile station using a half-duplex HSCSD protocol. Level measurements 53, 55, 57 of the neighbour base station's transmission are made only during the Idle period shown in the figure, and not during the TDMA frames used for the actual user traffic transmission. This Idle period contains one whole normal empty frame and any preceding or succeeding unused time slots. In the example of FIG. 5 the Idle period begins when the stationary mobile station has finished to transmit TX information in the transmission time slot 3. The Idle period is ends when the stationary mobile station begins to receive the base station's transmission RX in the time slot 0 of the reception frame. In the example a total of 9 time slots is available for the level measurements of the neighbour cell transmissions. During the available Idle period the frequency synthesiser of the stationary mobile station has time to make three frequency hops to the frequencies used by the neighbour cell base stations and to find the FCCH and SCH channels. With the practice according to the invention the frequency synthesiser of the stationary mobile station can make all required frequency hops within a reasonable time in order to perform the level measurements of the transmissions from the base stations of all six surrounding cells. Thus a stationary mobile station according to the invention can use a conventional frequency synthesiser.

The practice according to the invention can be applied also in a movable mobile station when it is known or detected to be stationary. The mobile station can be detected to be stationary by examining the transmission advance which it requires. If the transmission advance does not change, then the mobile station is stationary. When the monitoring of the unchanged neighbour cell information is left outside the TDMA frames used for data transmission it is possible to allocate to the mobile station more time slots in the TDMA frame, for instance when transmitting data, images or a video picture.

In GPRS systems there are available more versatile transmission protocols than in the GSM systems. Within the framework of these the neighbour cell monitoring can be made in the same way as in a mobile station according to the invention. In the GPRS systems a mobile station can further request, when required, the base station to allocate to it a sufficient number of empty frames, so that it is able to perform the required monitoring operations. Thus in a method according to the invention there is no need for neighbour cell monitoring in the GPRS system during the actual TDMA frames, but the neighbour cell monitoring can be concentrated to those periods when the GPRS mobile station is in the Idle state.

Figure 1:
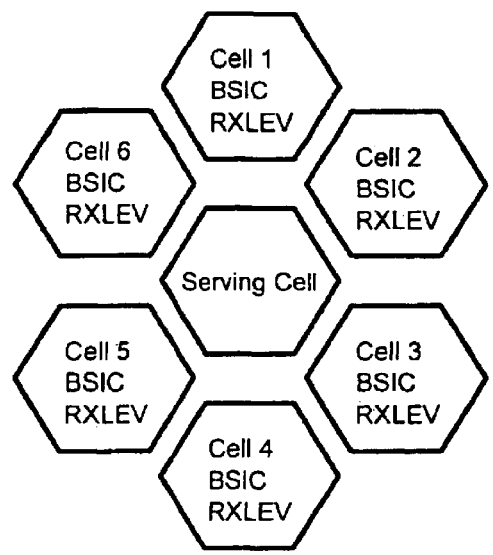
FIG. 1 shows the basic structure of a cellular network.
Figure 2:
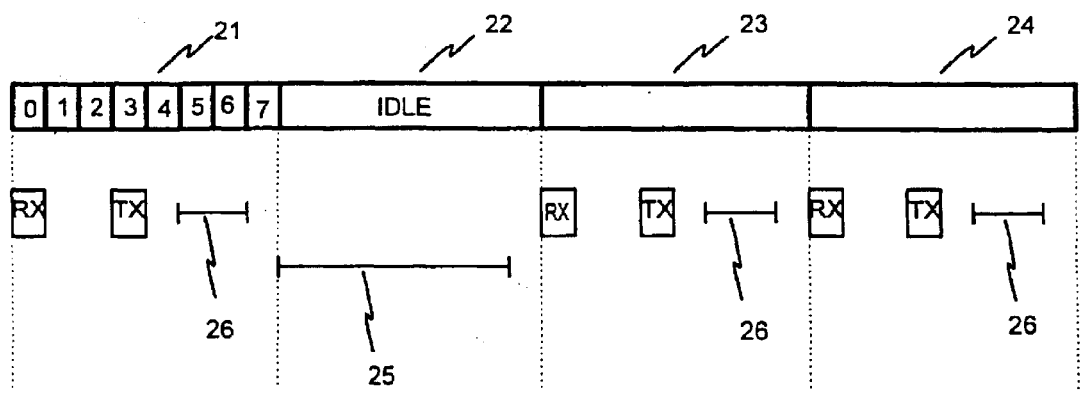
FIG. 2 shows the general frame structure of the GSM system.
Figure 6:
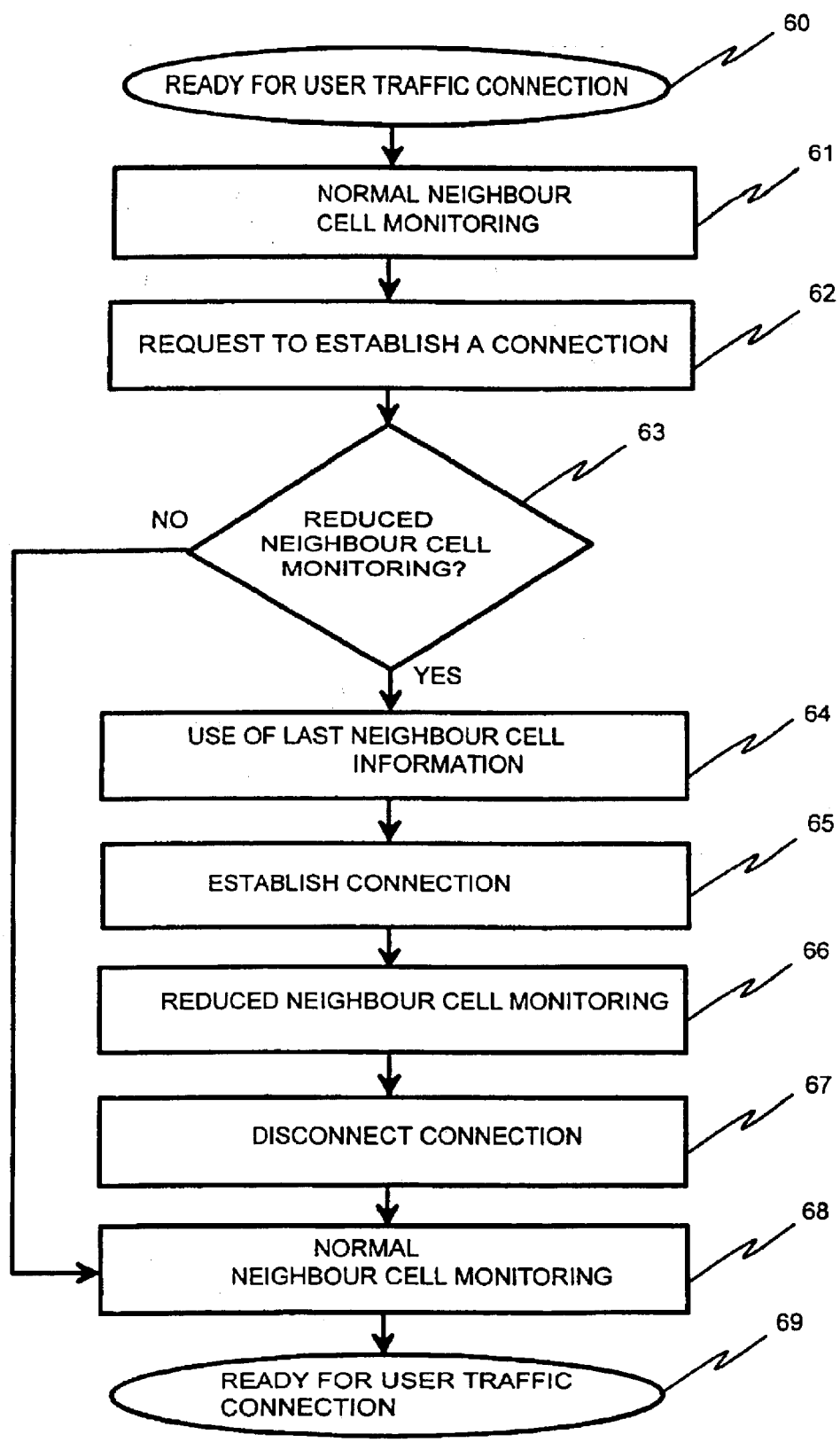
FIG. 6 shows in a flow diagram the monitoring in a mobile station according to the invention.

FIG. 6 shows a simplified flow diagram of the operation in a mobile station according to the invention when it performs neighbour cell monitoring. The flow diagram shows only the most essential method steps. Initially the mobile station is in the standby state in order to establish a connection, step 60. Then the mobile station performs normal neighbour cell monitoring, step 61, as it waits for a connection establishment request, step 62. When the connection establishment request has arrived there is taken a decision whether a reduced neighbour cell monitoring shall be used, step 63. If it is decided to continue the use of normal neighbour cell monitoring, the operation continues at step 68. If it is decided to switch to the reduced neighbour cell monitoring according to the invention, then the last complete neighbour cell monitoring results are stored in the memory of the mobile station, step 64. When the data has been stored the connection is established in a normal manner, step 65. During the established user traffic connection, in step 66, out of the neighbour cell transmissions only the level information in the transmission from each base station is received and examined during the empty TDMA frames. The identity codes (BSIC) transmitted by the base stations are not received nor decoded during a user traffic connection. In step 67 the user traffic connection is disconnected. Then the mobile station switches to the normal neighbour cell monitoring, step 68. Finally there is step 69, where the mobile station is again ready to establish a new user traffic connection.

Figure 7:
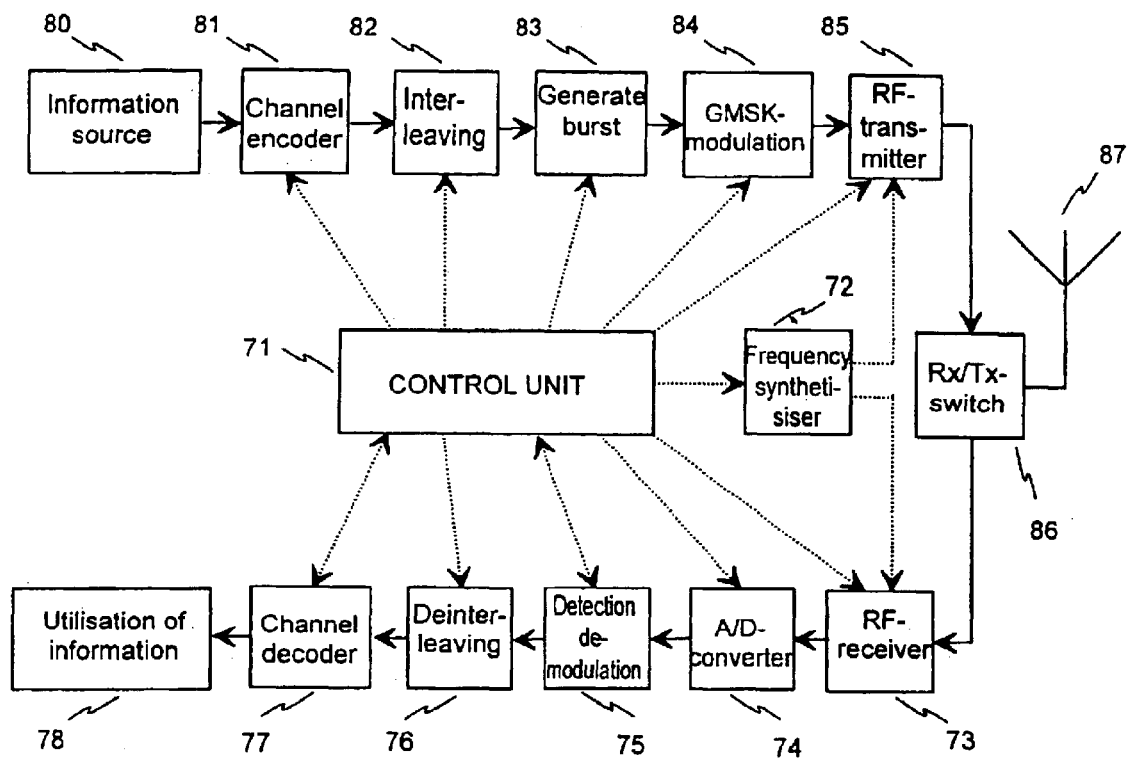
FIG. 7 shows in a block diagram the essential parts regarding the invention in a stationary mobile station according to the invention.

FIG. 7 shows in a block diagram those parts of a stationary mobile station according to the invention operating in a GSM network which are essential regarding the invention. The changes caused by the invention are mainly included in the control unit 71, which controls the frequency synthesiser 72, which changes the transmission and reception frequencies of the RF receiver 73. In a situation according to the invention where neighbour base station level measurement is performed during the connection the control unit 71 set the reception frequency, at a moment which it has determined, to the frequency of the base station of the desired neighbour cell. The frequency of the base station in the neighbour cell is typically obtained from a so called neighbour cell list, which a mobile station according to the invention has received from the BCCH channel and stored in its memory before the user traffic connection is established.

In a transmission situation the encoded sample stream obtained from the information source 80 is further directed to a two-stage channel encoder 81, which comprises a block and convolution encoder. The block encoder adds a bit pattern at the end of each information frame, and the convolution encoder increases the redundancy of the frame formed above by increasing the length of the frame. Both operations are made in order to make the error detection and correction easier at the reception. The length of the frame formed in the channel encoding is 456 bits.

The next step is a two-stage interleaving 82. First the bit sequence of the frame formed above is processed with a certain algorithm, and the obtained new frame is divided into eight parts of equal size. These parts are further placed into eight consecutive TDMA frames. The most important object of the interleaving is to spread the transmission errors, which generally occur in a certain burst, evenly in the eight frames. Thus errors which occur in sequential bits during the transmission of the TDMA frame causes single bit errors in the frames formed in the channel encoding, which are easier to correct.

The transmission is also encrypted so that the transmitted information should not be available to unauthorised persons. The encrypted data is converted into an information burst in the block 83 by adding a training sequence, end bits and time. Then there is performed a GMSK (Gaussian Minimum Shift Keying) modulation 84, where the bits are converted from the digital form into an analogue signal so that different phases in the transmission signal correspond to the bits. Finally the modulated burst is transmitted at a radio frequency by the RF transmitter 85 via the Rx/Tx switch 86, which now is in the transmission position, and then to the antenna 87. The relevant frequency used by the transmitter is obtained from the frequency synthesiser 72.

The receiving sections of the mobile station operate in an inverted manner regarding what was presented above. This is briefly described below.

In a normal situation information is received from the antenna 87 when the Rx/Tx switch 86 is in the reception position and directs the signal to the RF receiver 73 having a reception frequency generated by the frequency synthesiser 72. Then the signal is supplied to the analogue-to-digital converter 74 which converts the analogue signal into a digital one. Then there is performed a detection demodulation 75, and in connection with it the obtained level measurement information (RXLEV) of the neighbour cell information is supplied to the control unit 71. After the detection demodulation there is deinterleaving 76 and channel decoding 77, whereby an aim is to correct any bit errors. After the channel decoder the BSIC information obtained from the neighbour base station measurements is supplied to the control unit 71. After the channel decoder 77 there is yet decoding of the source information in the block 78 before it can be utilised. On the basis of the neighbour cell monitoring information which the control unit 71 has received it performs the required operations in order to maintain the user traffic connection and to control the neighbour cell monitoring.

The sections 72 to 77 and 81 to 85 in the figure are controlled by the control unit 71, where the changes according to the invention are made. The changes required by the invention are mainly software changes in the control unit 71 which enable the operation according to the invention. When the practice according to the invention is applied, only the level information (RXLEV) is received from the transmission transmitted by the neighbour cell base station, and after detection demodulation 75 this level information is supplied to the control unit 71. The neighbour cell base station identity code (BSIC) is not received. Thus the method according to the invention can use a normal frequency synthesiser in the mobile station, or the procurement of one separate frequency synthesiser is avoided.

Some applications of the invention and ways to realise them were presented above. Of course the invention is not limited to the examples presented above, but the principle according to the invention can be varied within the scope of the claims, for instance regarding the embodiment details and fields of application. Particularly it must be noted that even though the examples presented above relate to the application of the invention in a stationary mobile station in the GSM system, the invention can be used also in other digital TDMA cellular systems. Further the invention can be applied also in mobile stations at such moments when the mobile station is found to be stationary, or moving very slowly.

What is claimed is:

1. A method for determining channel information in a cellular system, where a TDMA transmission protocol is used on the traffic channel allocated to the connection for transmitting user information during a connection between a mobile station and a base station of the current cell, in which method the base station identity codes (BSIC) (61) of the neighbour cells are received and stored, characterised in that said reception of the base station identity codes of the neighbour cells is prevented during the whole user traffic connection (66).

2. A method according to claim 1, characterised in that
    neighbour cell base station identity codes (BSIC) are received and stored in the memory of the mobile station before the user traffic connection is established; and
    when the user traffic connection has been disconnected the mobile station receives identity codes or the neighbour cell base stations and updates in the memory any changes, which have occurred during the previous user traffic connection.

3. A mobile station which belongs to a cellular system and which comprises means (71 to 87) for transmitting/receiving user information on a traffic channel using a TDMA protocol between the base station of the current cell and the mobile station, and means (71 to 77) for receiving and storing the base-station identity codes (BSIC) of the neighbour cells, characterised in that it comprises means (71 to 77) for preventing said reception of the base station identity codes of the neighbour cells during the whole user traffic connection.

4. A mobile station according to claim 3, characterised in that it is a stationary mobile station.

* * * * *